Figure 7:
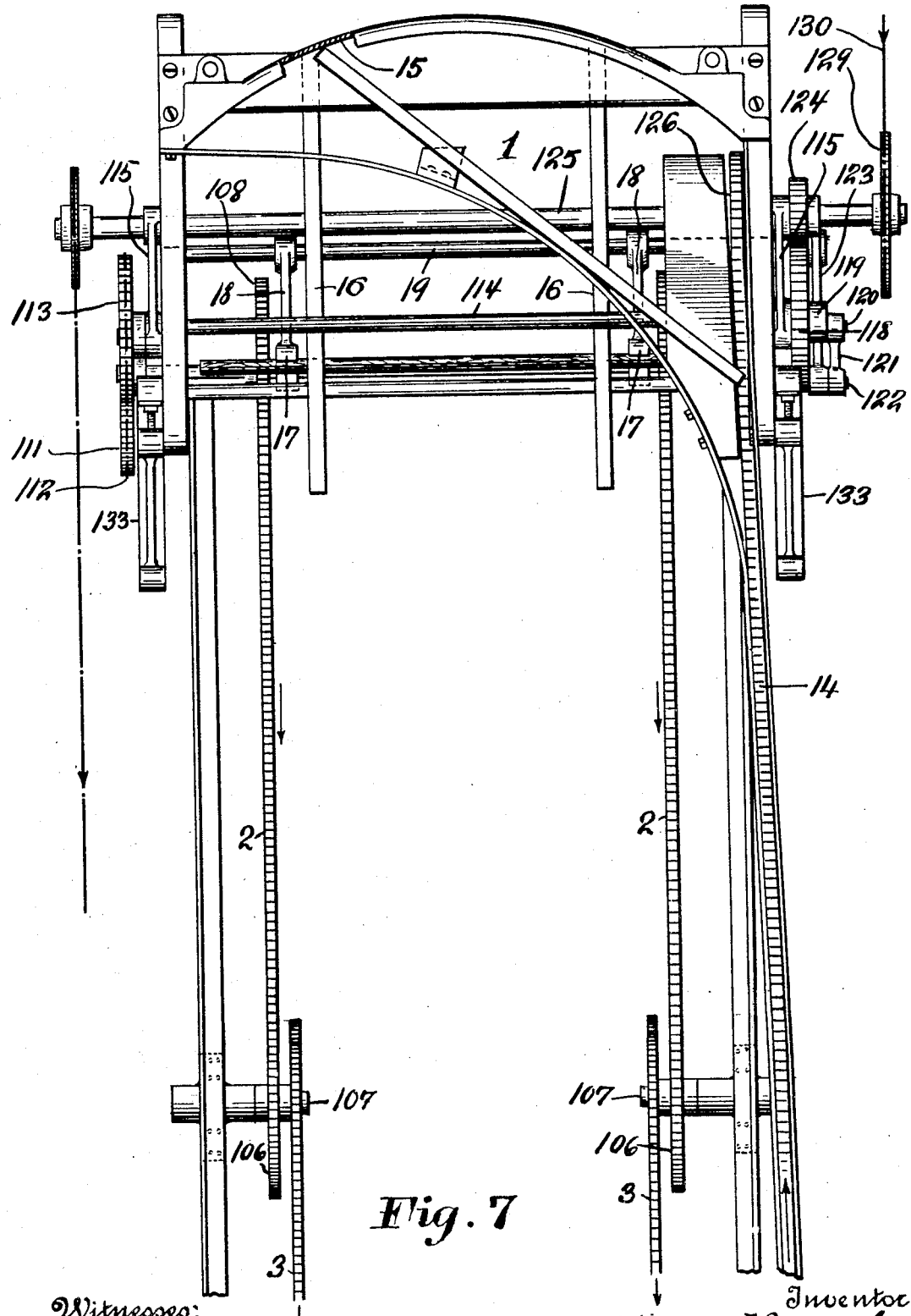

W. F. MARRESFORD.
AUTOMATIC STICK CIRCULATING MACHINE.
APPLICATION FILED APR. 27, 1911.
1,125,363.
Patented Jan. 19, 1915.
8 SHEETS—SHEET 1.
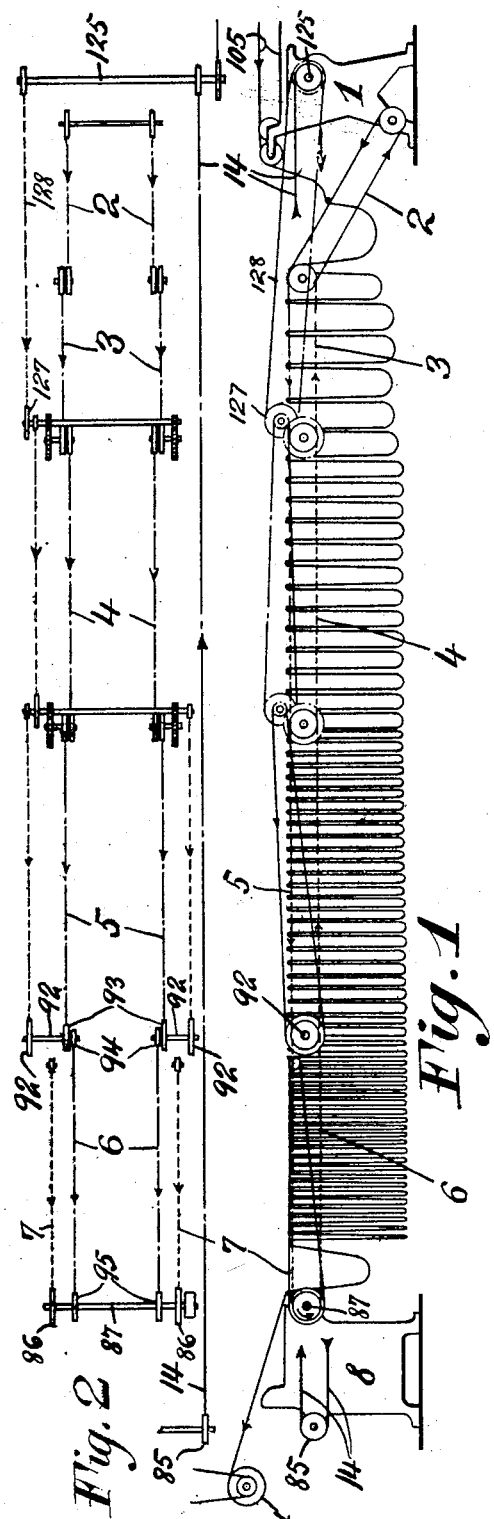
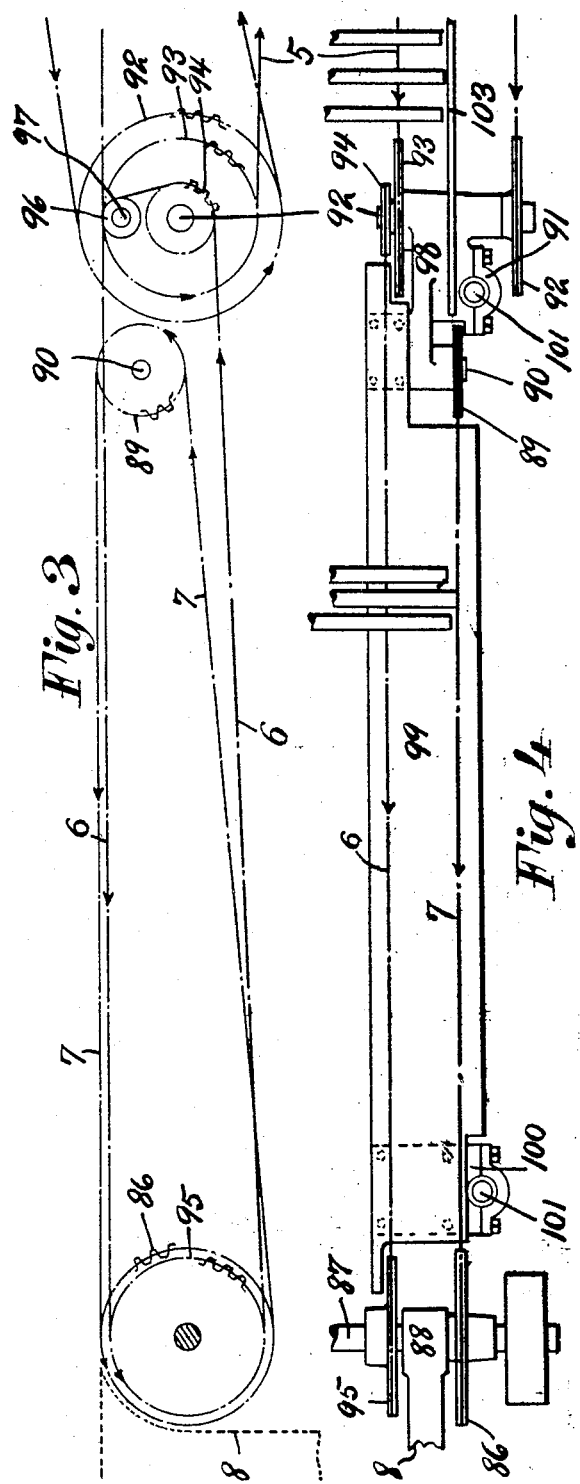

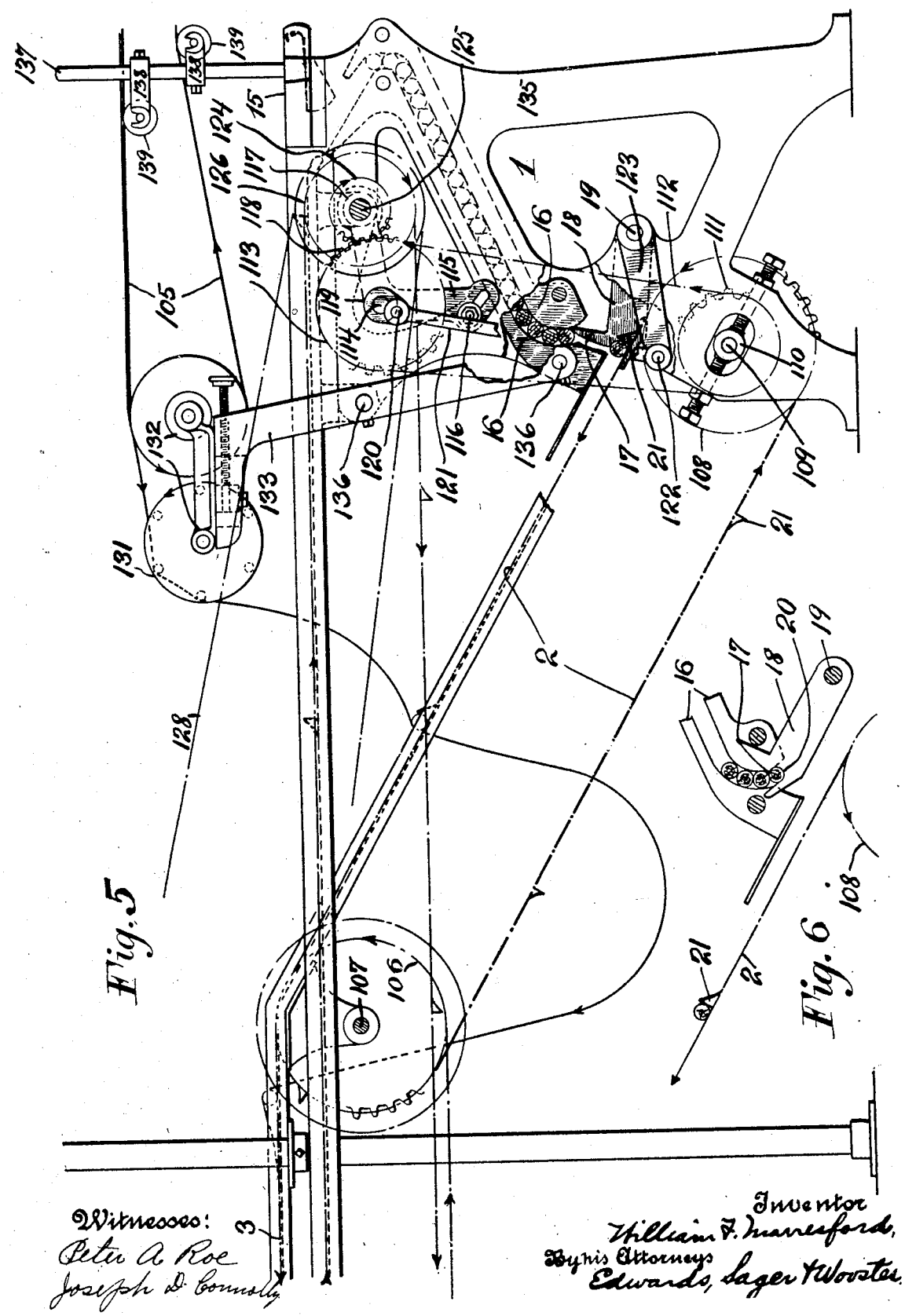

W. F. MARRESFORD.
AUTOMATIC STICK CIRCULATING MACHINE.
APPLICATION FILED APR. 27, 1911.

1,125,363.

Patented Jan. 19, 1915.
8 SHEETS—SHEET 4.

Witnesses:
Peter A. Roe
Joseph O'Connolly

Inventor
William F. Marresford,
By his Attorneys
Edwards, Sager & Wooster

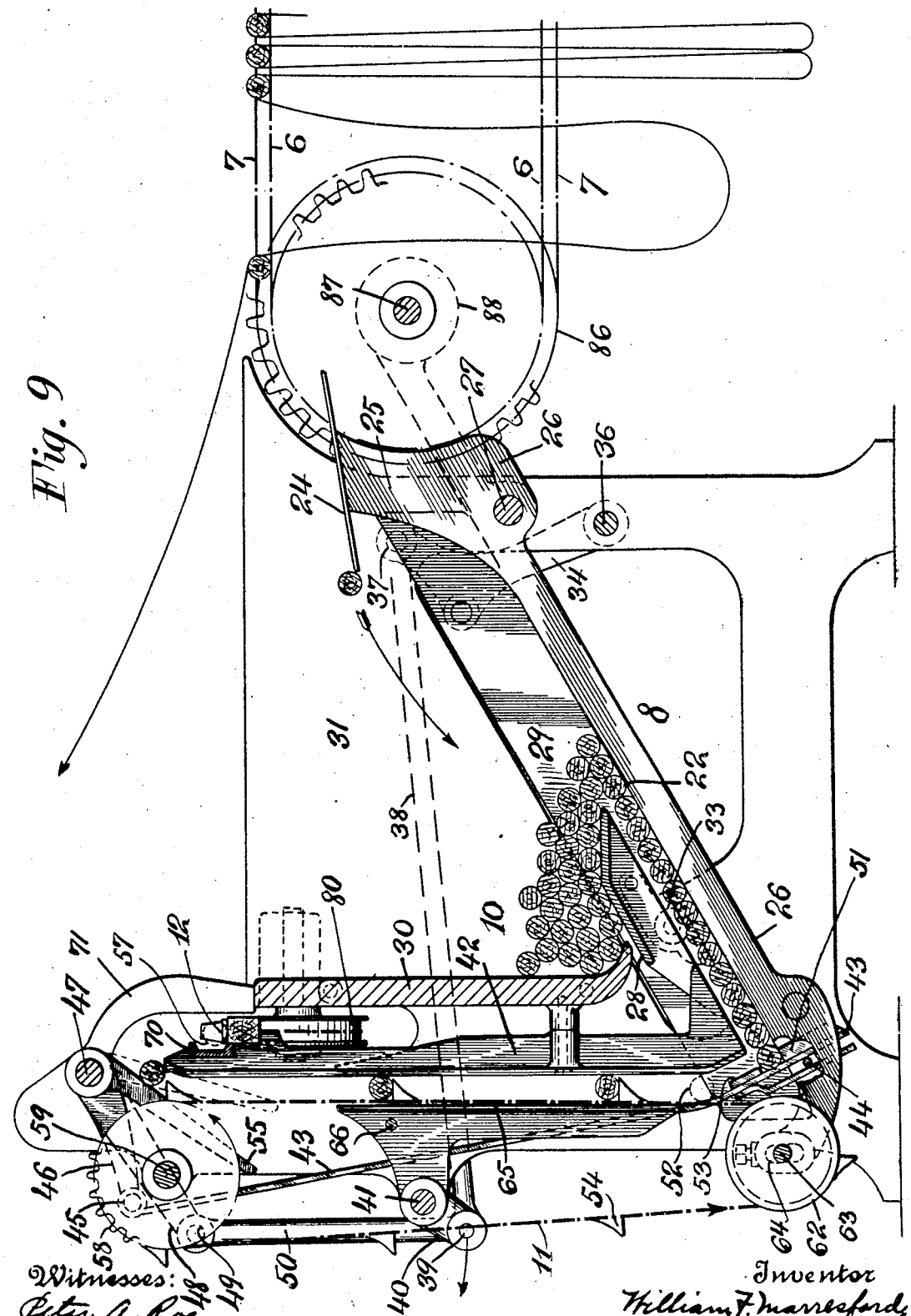

W. F. MARRESFORD.
AUTOMATIC STICK CIRCULATING MACHINE.
APPLICATION FILED APR. 27, 1911.

1,125,363.

Patented Jan. 19, 1915.
8 SHEETS—SHEET 6.

W. F. MARRESFORD.
AUTOMATIC STICK CIRCULATING MACHINE.
APPLICATION FILED APR. 27, 1911.

1,125,363.

Patented Jan. 19, 1915.
8 SHEETS—SHEET 8.

Witnesses:
Peter A. Roe
Joseph D. Connolly

Inventor
William F. Marresford,
By his Attorneys
Edwards, Sager & Wooster

UNITED STATES PATENT OFFICE.

WILLIAM F. MARRESFORD, OF BROOKLYN, NEW YORK.

AUTOMATIC STICK-CIRCULATING MACHINE.

1,125,363.  Specification of Letters Patent.  Patented Jan. 19, 1915.

Application filed April 27, 1911. Serial No. 623,611.

*To all whom it may concern:*

Be it known that I, WILLIAM F. MARRESFORD, a citizen of the United States, residing at Brooklyn, in the county of Kings and State of New York, have invented certain new and useful Improvements in Automatic Stick-Circulating Machines, of which the following is a full, clear, and exact specification.

This invention relates to automatic stick circulating mechanism for paper or cloth coating or printing machines, and has particular reference to machines for making wall paper, wherein a web of cloth or paper after being coated or printed is hung in loops on sticks, which sticks are automatically fed through the machine as the paper is wound up after having dried.

The particular object of the invention is to provide a complete mechanical control of the sticks upon which the paper or other material is hung while drying, and also to automatically return the sticks to the starting point so that they can be used again, without necessitating manual handling during the operation.

A further object of the invention is to provide a machine which will have a greater flexibility and range of operation during the entire process of coating and rolling up the finished stock.

Machines of this character are of considerable length, and it has heretofore been proposed to automatically supply sticks to the wet paper and to mechanically feed the sticks carrying the loops of wet paper until the paper dried to such an extent that it would not adhere or become marred when the loops touch. In such machines, when the loops become sufficiently dry, the mechanical feed of the sticks stopped, and the feed of the forward sticks has been accomplished to a limited extent by the crowding action of the ones behind, the sticks thus sliding upon what is termed in the art a "dead rail." Such dead rails may be as long as ten feet, and their object is to allow an accumulation of dry paper and sticks thereon while the rear rolling devices are not in operation, as when one roll is being changed for another, or for any other reason. Where such dead rails are used in advance of the rolling up mechanism, it is customary for the operator to push a number of sticks forward to the end of the dead rail so that the sticks would only have to slide a few feet on the dead rail as the paper is pulled off by the rolling up mechanism. In practice, it has been found that the sticks will not always slide straight if pulled on the dead rail more than a few feet, and in case the sticks do not slide straight they fall between the dead rails, and in doing so frequently puncture the paper. This necessitates stopping the machine to take out the damaged section, and the attention of an operator is required to keep the sticks and the loops of paper pushed up to the forward end of the dead rail as fast as the paper is wound off.

In order to obviate frequent stoppage of the coating or printing devices whenever the rolling up mechanism is stopped, it is necessary that the dead rail be made as long as possible, but if it is made too long and the operator does not keep pushing the sticks toward the front of the dead rail, the sticks tend to ride up on one another as a number accumulate at the rear of the dead rail, and also to become displaced.

According to this invention, I propose to do away with the dead rail and provide what I call a "live rail" whereon the sticks carrying the loops of dried paper can accumulate in number to an extent dependent upon the length of the live rail, and having also means for automatically maintaining the sticks in alinement, thereby preventing the sticks from dropping through before they reach the end of the live rail, and also permitting a greater independence of operation of the winding up and coating devices. It is objectionable to stop the coating devices, because when the paper web is stopped the coating devices make a mark or fail to print, thereby requiring that section to be cut out, which involves both delay and waste, but which with machines heretofore known has been unavoidable because of the physical limitations imposed by the use of dead rails, or unless an operator be kept to watch the dead rail and keep the web pushed forward, and also to straighten the sticks whenever necessary.

Round sticks roll easily and are recognized as advantageous over flat sticks, as the latter are weak, warp badly, and crease the paper, but the use of round sticks with dead rails is practically prohibited because of the greater tendency of round sticks to ride up on each other as compared with flat sticks. By this invention round sticks can be as easily handled as flat sticks and a much greater accumulation of coated web on the live rail permitted without requiring attendance of the operator and eliminating the chance of the sticks damaging the web.

A further feature of the invention relates to the arrangement of parts and the details of construction whereby the sticks are automatically handled throughout the cycle of operations, as will be more fully understood in connection with the description of the accompanying drawings, wherein—

Figure 8:
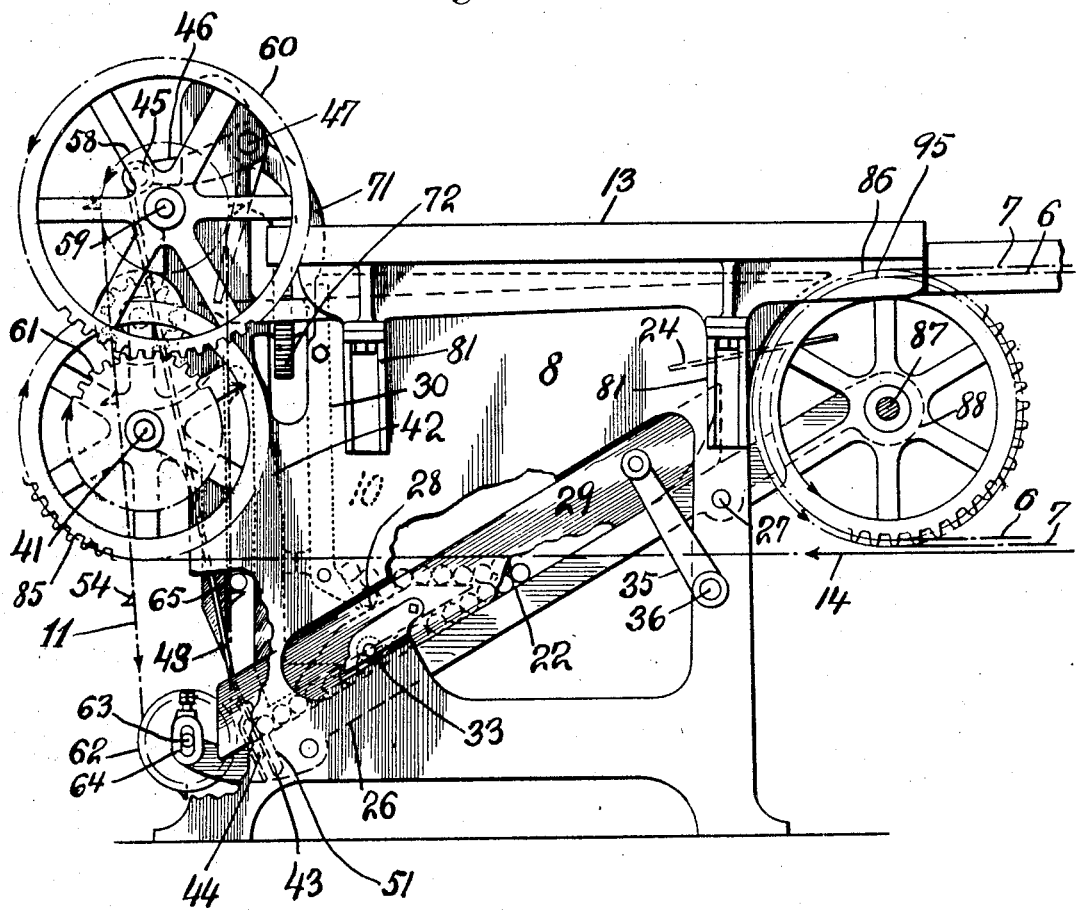
Figure 15:
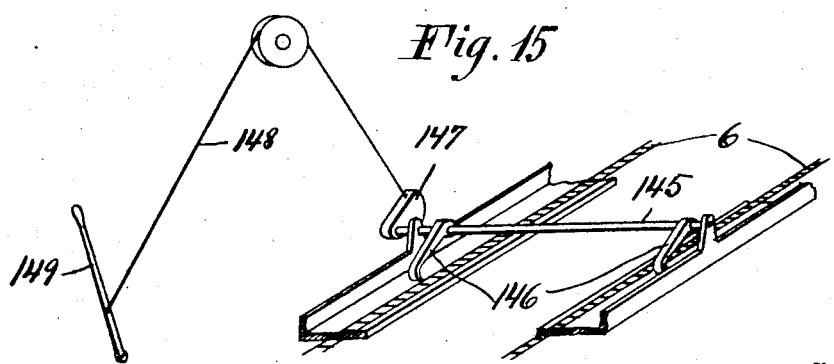
Figure 10:
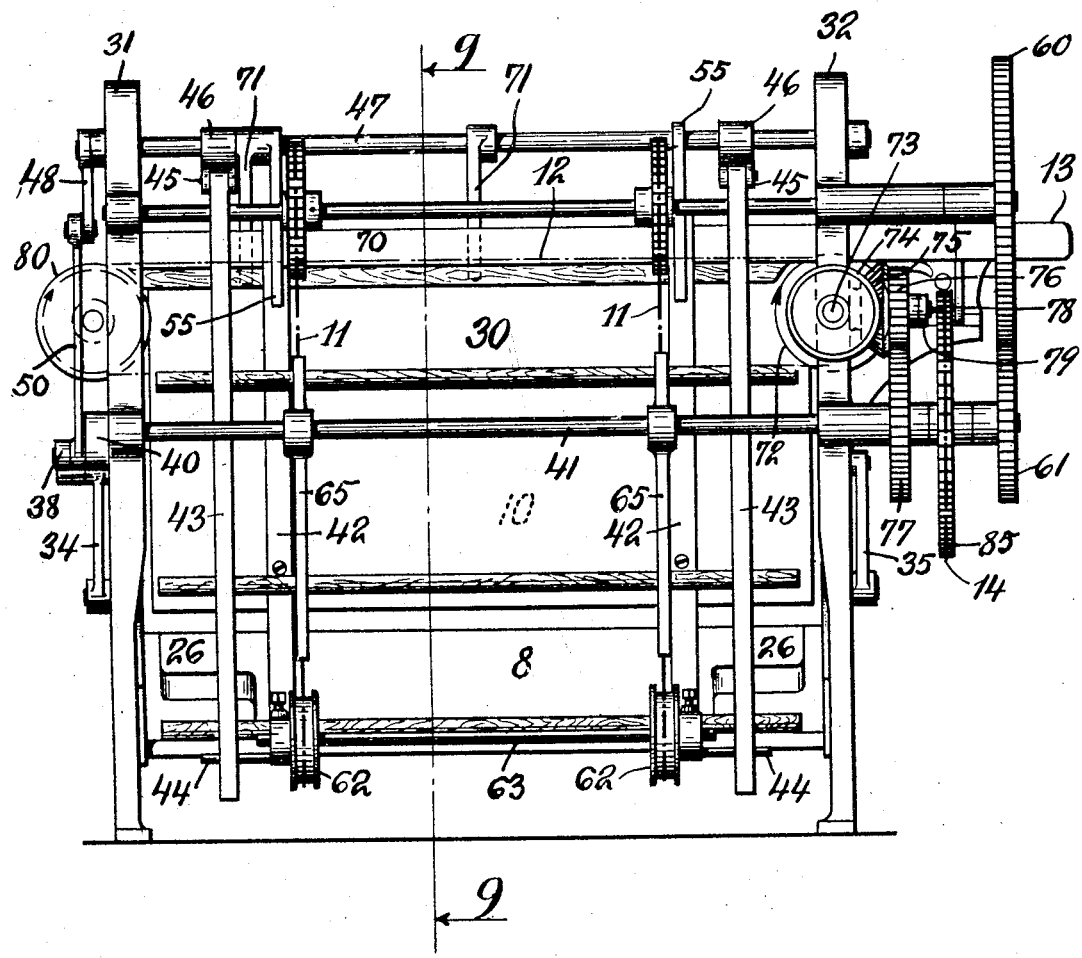
Figure 11:
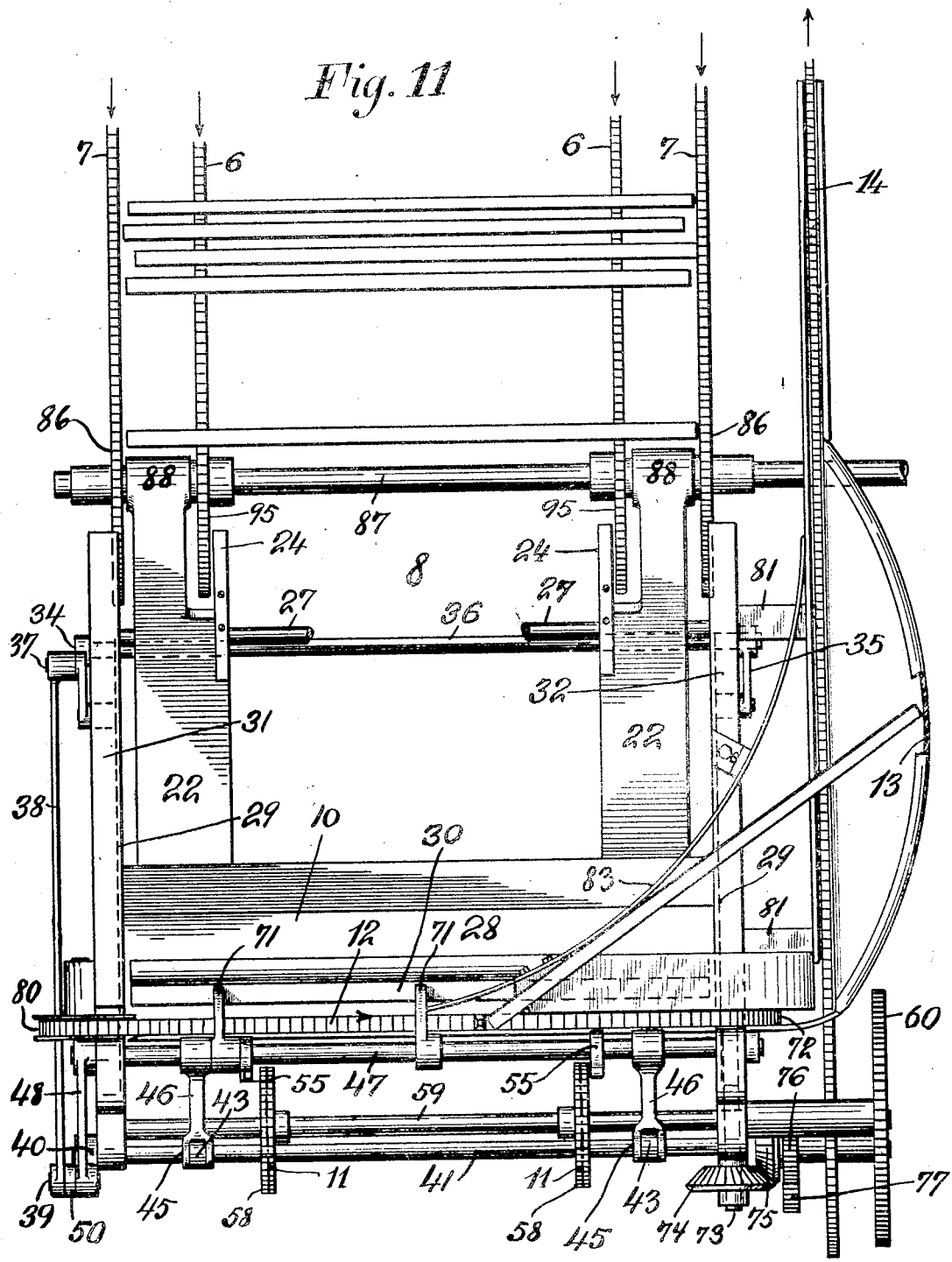
Figure 12:
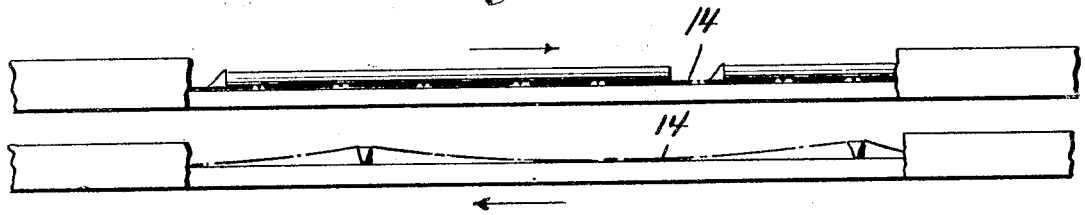
Figure 13:
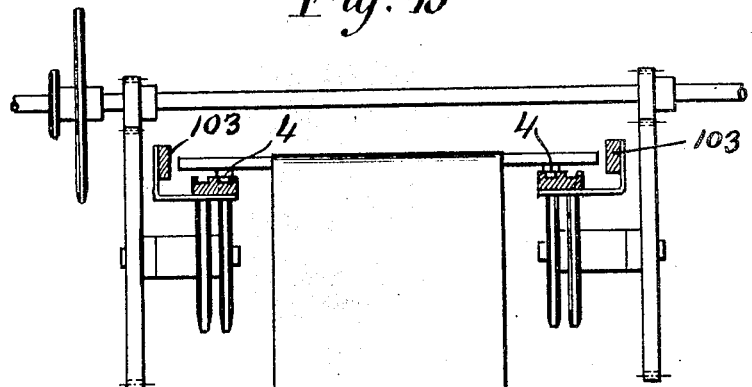
Figure 14:
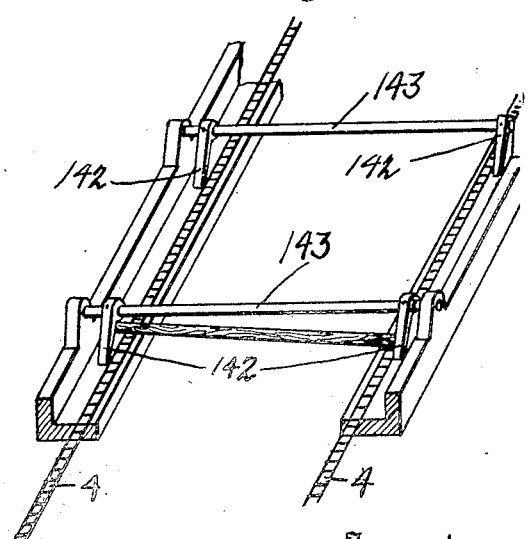

Figure 1 is a diagrammatic elevation of a machine embodying the invention; Fig. 2 is a diagrammatic plan view; Fig. 3 is a detail elevation showing the stick carrying and controlling chains on the live rail; Fig. 4 is a plan view of one side of the live rail showing the sticks being carried and guided; Fig. 5 is a side elevation of the feed box for supplying sticks to the coated web; Fig. 6 is a detail of a portion of the stick controlling devices; Fig. 7 is a plan view of the stick feeding box; Fig. 8 is an elevation of the stick receiving box; Fig. 9 is a section of the stick receiving box taken on line 9, 9 of Fig. 10; Fig. 10 is a rear elevation of the stick receiving box; Fig. 11 is a plan view of the stick receiving box and associated parts; Fig. 12 is an elevation showing the stick returning chain support; Fig. 13 is a vertical cross section of the rack; Fig. 14 shows a modified mechanism for automatically straightening the sticks on the live rail, and Fig. 15 shows a stick stopping device.

The machine comprises generally a stick feeding box 1 from which sticks are taken by endless rack conveyers 2, engaging the ends of the stick and fed to the first section 3 of the horizontal or drying rack, on which the loops of paper web are received from the coating or printing devices, not shown, and carried in wide loops while the first drying occurs.

4, 4 represent conveyers forming a second section of the rack, receiving the sticks carrying the loops of paper from the first section of the rack, but moving at a somewhat slower speed so that the loops on the second section of the rack are more closely together than on the first section.

5, 5 represent endless conveyers forming the third section of the rack and receiving the sticks with the loops of paper from the second section, and moving more slowly than the second section, so that the loops on the third section are more closely together than those on the second, having become more dry. Three sections of racks is the number commonly used, but more or less can be used if desired, the function of these rack sections being to carry the sticks and the loops during the drying period. In machines heretofore used, the rack has delivered the sticks carrying the now dry loops to the dead rail, on which a limited number of sticks could slide without over-riding or without falling between the dead rail. The difficulty has been in the winding up operation, during which the sticks are expected to slide along the dead rail, but as above stated frequently fall through and tear the paper, so that to prevent this as far as possible, the operator has pushed the sticks forward on the dead rail from time to time so that they would only have to slide a short distance before falling from the web when wound up.

6, 6 represent horizontal carrying chains driven at a much slower rate than the slowest section of the rack, and forming what I term the "live rail." The live rail chains are formed of pivoted links, so constructed that when slid on the frame of the machine the upper surface of the links is smooth and practically continuous, to such an extent that the sticks can freely slide thereon without being caught. These live rail chains run over suitable sprockets and move slowly as compared with the rack chains. Thus the sticks can accumulate on the live rail in the same manner as on the dead rails of the prior art, but the live rail positively feeds the sticks while permitting them to slide on the smooth chain surface, so that the live rail can be made several times longer than dead rails, and because of the positive feed, round sticks would not over-ride each other. The live rails herein described will carry either round or flat sticks, and while round sticks are more advantageous for the reasons above pointed out they have heretofore been more difficult to handle because they very readily over-ride each other when pushed from behind, because of the resistance of those in front. When the front sticks are pulled along the dead rail by pull off or winding up devices, they slide unevenly and very rarely travel straight, whether round or flat. The principal cause of this is that the web warps in drying, and it cannot be relied upon to pull the sticks evenly to the end of the dead rail, whereupon the sticks fall out of the loops as they are wound up.

7, 7 represent stick straightening chains which move parallel to the live rail chains, but outside thereof, and at a faster speed. These chains are inoperative on the sticks so long as the sticks remain parallel, which they may while passing over the major portion of the live rail, but when they have progressed on the live rail so far that the rolling up tension of the web commences to move them faster than the live rail chains are moving, the sticks commence to slide (if flat) or roll and slide (if round) on the live rail chains. If one edge of the web is tighter than the other, or if one end of the stick should be retarded for any reason more than the other end, the stick will naturally swing out of parallelism with the other sticks, and will continue in this direction until one end falls off the live rail chain and allows the stick, together with the particular loop of web supported thereby, to fall. The function of the stick straightening chains moving faster than the web rail chains is to straighten the sticks, since it will be seen that as soon as one end of the stick strikes the chain, that end of the stick will be pushed forward by the chain and straightened. If the stick is pushed too far by the straightening chain, it will tend to go to the opposite side and strike the other straightening chain, and so the stick will be prevented from falling off the live rail chains and be carried along by the pull of the web until it falls off into the stick receiving box 8 (see Fig. 9), which shows the web being pulled off while one stick is about to fall and another has just fallen, the sticks falling down into the receptacle 10. From the receptacle 10 the sticks are picked up one by one by elevating chains 11, 11, and dropped on to a transverse chain 12 (see Fig. 11), which has lugs to engage the ends of the sticks and push the sticks transversely against a curve guide 13, which straightens the sticks into a longitudinal direction of the machine and drops them on to the return chain 14, which latter carries the sticks back to the stick feeding box 1. The sticks are delivered by the chain 14 against a curve guide 15 at the front end of the machine, which turns the sticks transversely of the machine (see Fig. 7), and allows them to drop on to inclined bars 16, arranged to form a channel in which the sticks drop one by one (see Fig. 5). The bottom of the channel formed by the bars 16 is closed by thumb pieces 17, mounted on arms 18, and mounted on rock shaft 19. These arms oscillate from the position shown in Fig. 5, which holds back the lower stick, to the position shown in Fig. 6, wherein the fork 20 receives the stick, and upon the return motion carries it downward past the end of the channel 16 to the position shown in Fig. 5. At that instant lugs 21 on inclined chains 2 engage the stick and remove it from the notches 20, carrying it obliquely upward until it contacts with the web of paper, and then onward until it is deposited upon the stick carrying chains 3, 3 forming the first section of the rack, and completing the circuit of the sticks.

I have shown herein, in addition to the main combinations of stick handling mechanisms just described, a preferred form of stick separating and feeding mechanism for the receiving box 10, as well as the feeding box 1. It will be seen that sticks will accumulate in the receiving box as the web is pulled off faster than they will be used by the stick feeding box, and I prefer to allow the sticks to accumulate in the receiving box, as shown in Fig. 9. It will be seen that the sticks slide down in a channel formed by the inclined rails 22 from the receiving strips 24. The strips 24 are secured to upward extensions 25 and bed plates 26, supported on tie rods 27 of receiving box 8. From strips 24 the sticks fall to accumulate in a pocket formed by bed plates 26, straightener bar 28, straightener plates 29, a fixed apron 30, and side frame 31, 32. The straightener bar 28 is rigidly secured to straightener plates 29, supported opposite the straightener bar 28 on anti-friction bearings 33 on side frames 31, 32, and at their upper ends pivotally connected to rocker arms 34, 35, secured to rock shaft 36, journaled in side frames 31, 32. The rocker arms receive an oscillating motion through stud 37, link 38, stud 39 and crank 40 from motion shaft 41, which is the driving shaft of receiving box 8. This causes the wedge-shaped nose of straightener bar 28 to pass through the pile of sticks, and causes those above, as well as below, to fall into accurate alinement, which is necessary in automatic stick handling devices, as the sticks naturally tend to fall crosswise of each other and need to be straightened before being returned. As the sticks are straightened by the oscillation of straightener bar 28, and straightener plates 29, they pass into a channel formed of bed plates 26, straightener bar 28, and the lower end of the upright guide standards 42, and go successively to rest against pick-up bars 43. The pick-up bars 43 are slidably supported at their lower ends by studs 44 projecting from bed plates 26, and are pivotally connected at their upper ends, as at 45 to oscillating arms 46 secured to rock shaft 47, which rock shaft receives motion through arm 48 secured thereto, stud 49, link 50 and stud 39 of crank 40.

Pick-up bars 43 are provided with shoulder pieces 51, which serve to lift the sticks successively to the position shown by the dotted circle 52 (Fig. 9). The pick-up bars 43 are also provided with stop blocks 53 which prevent the sticks from jumping irregularly or out of order, into the space between pick-up bars 43 and guide standards 42, and insure that one stick only will be picked up at a time. When the pick-up bars 43 have drawn a stick up to the position of dotted circle 52, one of the lugs 54 on elevating chains 11, 11 contacts with the stick and lifts it free of the pick-up bars 43. Thus, successive sticks, picked up by successive lugs 54 are carried up to the top of the guide standards 42, where a pair of gravity arms 55, depending loosely from rock shaft 47 push the successive sticks off lugs 54 and over the ends of upright guide standards 42, so that the sticks fall to the position shown by dotted circle 57. Elevating chains 11, 11 are driven by sprockets 58 (Figs. 8, 9, 10 and 11), mounted on shaft 59, journaled in side frames 31, 32, having secured to one end a gear 60 meshing with the gear 61, secured to the main shaft 41. The lower ends of chains 11, 11 run over idler sheaves 62 running on a stationary rod 63 adjustably mounted in slots 64 in extensions of bed plates 26. Upright guides 65 journaled on main shaft 41 and supported by studs 66 projecting from side frames 31, 32 prevent undue vibration of elevating chains 11.

Straightener bar 28 and straightener plates 29 are so timed that they move toward the pick-up bars 43 as the latter near their lowest position, so that the stick is pressed firmly into contact with pick-up bars 43, both by the action of these parts and by the weight of the following sticks, thus securing uniformity in the pick-up action. The novel connection of links 38 and 50 to crank 40 accomplishes this result. The angle of movement of the lower ends of the pick-up bars 43 and their upward travel is such as to permit the sticks to clear the stop blocks 53 when picked up by lugs 54 of the elevating chains 11. In practice there is always a greater or less accumulation of sticks in the pocket 10 of receiving box 8.

In Fig. 9, it will be seen that after each stick is deposited on the cross feeding chain 12, it is moved transversely of receiving box 8 by the lugs on the chain. The stick is prevented from rolling sidewise off the chain 12 by channel strip 70 and arms 71 (Figs. 9 and 11) depending loosely from rock shaft 47. Chain 12 is driven by sprocket 72 (Figs. 10 and 11) secured to a short shaft 73 journaled in side frame 31, and having at its outer end a bevel gear 74, which is actuated by another bevel gear 75 secured to a spur gear 76, the latter meshing with a spur gear 77 secured on main shaft 41. The bevel gear 75 and spur gear 76 turn together but loosely upon a stud 78 projecting from side frame 31 and are held in place by a collar 79. The chain 12 travels in the direction indicated by the arrow in Fig. 11, and delivers the stick against the end of the curved channel plate 13 above referred to, which is secured to brackets 81 (Fig. 8), in turn secured to side frame 31. Thence the stick is carried until delivered to the feeding box, as previously described.

Before the stick is delivered to the return chain 14, it is guided by vertical guide bars 13, 83 until the stick has been turned through an angle approximately ninety degrees to enable it to roll or drop on to the return chain 14. As shown, the return chain 14 moves in a channel which holds the sticks on the chain.

Sprocket wheel 85 secured on main shaft 41 is driven directly by the return chain 14.

The controlling or stick straightening chains 7, 7 which operate on the ends of displaced sticks, are driven by sprockets 86 mounted on shaft 87 running in bearings 88 projecting from receiving box 8 (see Fig. 11). Shaft 87 may be rotated through any power source running continuously, and continues to operate chains 7 even if all of the other parts of the mechanism are temporarily at rest, so that if the winding up or other web removing means continues to operate, the sticks will be certainly guided to the end of the live rail, and thence into receiving box 8. The rear ends of chains 7 are carried on idler sprockets 89, running loosely on studs 90 projecting from bracket 91 (Fig. 4). A shaft 92 rotates in a bearing in bracket 91, and is driven by a sprocket. Secured to the opposite end of shaft 92 is a sprocket 93 and a smaller sprocket 94. Sprocket 94 drives the slow moving live rail chains 6, which run at their other ends over idler sprockets 95 loosely mounted on shaft 87. Chains 6 run also over idler sheave pulleys 96 loosely mounted on stud 97 secured in bracket 98, which latter is adjustable on support or timber 99. The timber 99 is supported at one end as by bracket 91 and at the other end by bracket 100, said brackets being mounted on pipes or bars 101. The adjustment of brackets 98 allows for taking up wear or stretching in chains 6. Sprocket 93 drives the rack or slow moving carrying chains 5, the difference in speed being attained by the difference between the size of sprockets 93 and 94. Guide strips 103 opposite the ends of the sticks (Figs. 4 and 13) guide the sticks between controlling chains 7 as they come from chains 5, which guide strips 103 run the entire length of the rack The feeding box end of the machine 1 is driven from any convenient source of power, but at a speed uniform with that of the coloring or coating machine. The rack sections 3, 4, 5 are driven at a speed uniform with relation to the feeding box 1, but I prefer to drive the rack sections directly from moving parts of feeding box 1, so that when the operation of the feeding box is stopped or started, the whole rack stops or starts. Likewise, live rail chains 6 are driven from the feeding box 1. Receiving box 8 is driven from feeding box 1 directly through the return chain 14. This chain thus not only returns the sticks, but also drives the parts of receiving box 8 uniformly relatively to the feeding box 1.

In Fig. 1, 105 represents a web feeding device such as an endless belt, on which the wet coated web is delivered from the printing or coating mechanism, not shown. The incline chains 2 in the feeding box run over idler sprockets 106 running on studs 107 at the upper end of the incline, and are driven by sprockets 108 mounted on shaft 109, which is adjustably journaled as at 110 in the side frames of feeding box 1. Shaft 109 is driven through sprocket 111, chain 112 and sprocket 113 from shaft 114, journaled in adjustable brackets 115 secured to the side frames by clamping screws 116, and pivoted at their opposite ends on sleeves 117 projecting from the side frames. Opposite sprocket 113 and secured on shaft 114 is a gear 118 having a crank hub 119 in which is mounted a stud 120. Connecting link 121 is pivoted on stud 120 and at its opposite end on stud 122 secured in arm 123 on rock shaft 36. The rotation of shaft 114 thus rocks shaft 36. Gear 118 on shaft 114 meshes with gear 124 on shaft 125, which is the driving shaft for the feeding box 1, and shaft 125 carries sprocket 126 which drives the return chain 14. The rack chains 3 are driven from shaft 125 by sprocket 127 and chain 128. Shaft 125 is driven from the main source of power through sprocket 129 and chain 130, or by other suitable means.

Preferably, I employ a beating out device 131 which receives the web from the feeding device 105, and which rotates considerably faster. The beating out device 131 has a polygonal shape so that it gives the web a vibratory motion and causes it to more perfectly loop itself over the sticks as they are supplied by the chains 2. The shaft of the driving drum of the feeding belt 105 and the shaft of the beater-out 131, are mounted as shown in Figs. 5 and 7, wherein their shafts are carried by adjustable journals 132 supported by standards 133 on the side frames 134, 135, such as by tie rods 136. Vertical rods 137 carry brackets 138 in which are journaled idler rollers 139 supporting the belt 105.

In Fig. 14 is shown a modification of the stick straightening means wherein the live rail chains 6 are constructed as before described, and the sticks when out of parallelism are straightened by oppositely disposed fingers 142 rigidly mounted on transverse rock shafts 143. When a stick is out of parallelism, as seen at the bottom of Fig. 14, the end which first strikes the finger 142 will be retarded until the other end strikes the opposite finger 142, and the combined push of both ends of the stick on both fingers simultaneously will lift the fingers and allow the now straightened stick to pass. When one end of the stick strikes a finger, it will be insufficient to lift both fingers, and the stick will not pass one finger ahead of the other finger.

In Fig. 15 is shown a stick stopping mechanism for stopping the sticks on the live rail when the rolling up devices 144 are stopped. This device comprises a shaft 145 similar to shaft 143, carrying hooked fingers 146, operated simultaneously upon rocking of the shaft 145. At one end of the shaft 145 is a weighted arm 147 connected by cord 148 to the controlling lever 149 of the rolling up devices 144. When the lever 149 is in off position, to stop the rolling up device, the weight 147 will be lifted, thus dropping the fingers 146 and obstructing the sticks as they are brought against the fingers 146 by the live rail chains 6, or by any other means. When the rolling up device is started it will be seen that the fingers 146 will be lifted and thereby the obstruction to passage of the sticks removed. By this means the live rail chains or other devices will not permit the looped web and sticks to fall down into the machine, as would happen in case of a prolonged stoppage of the rolling up mechanism without stopping the live rail chains.

From the foregoing description it is thought that the operation and advantages of the invention will be fully understood. It will be seen that by this machine very largely increased flexibility of operation is secured, that is, one part of the machine can be operated quite independently of the other, and one part of the process and machine can be stopped or started without requiring the other part of the process and machine to be stopped or started. Especially, it is not necessary to so often stop the printing or coating devices while the rolling devices are stopped. This is because by my improved live rail construction several times as large an amount of web and sticks can be accumulated as has heretofore been possible with dead rail devices. Furthermore, by means of the controlling chains in combination with the accumulation of sticks and the rolling up devices, it is impossible for the sticks to fall off before they reach the end of the live rail and damage the web. By these means the advantages incident to round sticks can be fully utilized without the difficulties heretofore encountered, or the flat sticks now used can be employed without the delays and damage to the web heretofore encountered. It will be observed that in the foregoing machine the entire control of the sticks is automatic and self-regulating, while permitting a very much greater accumulation without chance of injuring the web, than has heretofore been attained. It will also be seen that there are no obstructions to limit the length of the loops because the stick returning means occupies an inconsiderable amount of space beneath the usual rack driving mechanism outside the loops of web, and at such a distance above the floor that the operator can easily pass from one side of the machine to the other through the loops of paper. This arrangement is especially advantageous in cases of a double-decked mill. Also, with this machine, the sticks can be continuously circulated while the patterns or colors are being changed, or trials made, with or without a web, which avoids special preparations, or undue delays in operation. Thus a new pattern can be started, or a new run of web while an old one is being wound up and the sticks discharged into the receiving box and returned, thereby dispensing with stick-boys for collecting and starting the sticks.

Various modifications and changes in the specific details may be made without departing from the scope of the appended claims.

Having thus described my invention I now declare that what I claim as new and desire to secure by Letters Patent, is—

1. The combination with web supplying means, of stick supplying means, stick and web feeding means, web pull off means, stick straightening means, and means for positively feeding the sticks until the web is pulled off.

2. The combination with web supplying means, of stick supplying means, stick and web feeding means, web pull off means, straightening automatic means engaging the displaced sticks, and means for positively feeding the sticks until the web is pulled off.

3. The combination with web supplying means, of stick supplying means, stick and web feeding means, web pull off means, means for positively feeding the sticks until the web is pulled off, and stick straightening means moving in the same direction as the positive stick feeding means and effective upon the ends of displaced sticks.

4. The combination with web supplying means, of stick supplying means, stick and web feeding means, web pull off means, means for positively feeding the sticks until the web is pulled off, and stick straightening means moving at a greater speed in the same direction as the positive stick feeding means and effective upon the ends of displaced sticks.

5. In a machine for mechanically feeding sticks carrying a looped web to a web winding mechanism, conveyers running adjacent the edges of the web for carrying the sticks and looped web, a pull-off mechanism for removing the web and moving at a higher speed than said stick conveyers, and means preventing displaced sticks from falling between said conveyers.

6. The combination with a pull off mechanism, of means for supporting and permitting an accumulation of sticks carrying the looped web, and means engaging the sticks for preventing them from falling through the said supporting means as the web is being pulled off.

7. The combination with a pull off mechanism, of means for supporting and permitting an accumulation of sticks carrying a looped web, and means engaging the sticks for maintaining them in approximately parellel relation on the said supporting means as the web is being pulled off.

8. In a stick machine, the combination with a pull off mechanism, of live rail mechanism permitting the accumulation of sticks comprising longitudinally moving stick carrying chains having their upper surfaces smooth to permit the sticks to move thereon when the web is pulled.

9. The combination with rack conveying means for separated sticks, of live rail mechanism permitting the accumulation of sticks comprising relatively slower moving conveying means having a surface permitting the sticks to move in the direction of motion.

10. The combination with rack conveying means for separated sticks, of live rail mechanism comprising relatively slower moving conveying means having a surface permitting the sticks to slide in the direction of motion and controlling means for automatically straightening displaced sticks on said live rail mechanism.

11. The combination with relatively slow moving live rail chains, of faster moving controlling chains outside said live rail chains.

12. The combination with a web pull-off mechanism, of movable means for accumulating web carrying sticks, and means for receiving and automatically returning said sticks.

13. The combination with a web pull-off mechanism, of movable means for accumulating web carrying sticks, means for receiving an accumulation of sticks as released upon the withdrawal of the web, means for feeding said sticks one-by-one from said receiving means, and means for returning said sticks.

14. The combination with means for receiving and accumulating sticks, of means therein for straightening the sticks, means for releasing said sticks one-by-one, and means for turning said sticks from parallel to endwise relation.

15. In a stick machine, the combination with a plurality of rack feeding means moving at successively slower speeds, of means for feeding sticks to the faster of said rack feeding means, a live rail mechanism for receiving the sticks from the slower of said rack feeding means, and means for driving said rack feeding, stick feeding, and live rail means in unison.

16. In a stick machine, the combination with a plurality of rack feeding means moving at successively slower speeds, of means for feeding sticks to the faster of said rack feeding means, a live rail mechanism for receiving and accumulating sticks from the slower of said rack feeding means, a receiving box having means for automatically discharging sticks one by one, and means for driving said rack feeding, stick feeding, live rail and stick discharging means in unison.

17. The combination with stick supporting means, of stick straightening means for maintaining the sticks substantially parallel.

18. The combination with stick supporting means, of continuously operating stick straightening means.

19. The combination with a feeding box, and means for feeding sticks intermittently therefrom to a web, and driving means therefor, of a live rail mechanism for accumulating and feeding the sticks, and means for driving said live rail mechanism from said feeding box mechanism.

20. The combination with stick moving means, of a receiver for loose sticks, means in said receiver for straightening the sticks, of means for passing said sticks one by one to vertical lifting means, vertical lifting means, means for releasing sticks from said receiver one by one to said lifting means, means for receiving, moving and turning said sticks into successive endwise relation, and means located at one side of the machine and beneath the stick moving means for returning said sticks in endwise relation.

21. In a stick machine, a stick turning means comprising a longitudinally moving conveyer, a curved track at one end of the conveyer for turning the end of a stick and a curved interior guide for the intermediate portion of the stick, whereby the stick is turned to a right angle by the coöperation of said conveyer and said stationary guides.

22. The combination with stick supporting means, of rolling up means, and means obstructing the passage of sticks upon stoppage of the rolling up means.

23. The combination with stick supporting and feeding means, of means for engaging the sticks and causing one end of a displaced stick to move relatively to the other end to position said displaced stick in parallelism with normally positioned sticks.

24. The combination with means for conveying sticks in endwise relation, of means for accumulating the sticks and arranging them side-by-side in parallel contact, automatic means for releasing said sticks one-by-one from said accumulating and arranging means, and a conveyer for lifting the released sticks to said stick conveying means.

25. The combination with a box for accumulating sticks, of means for carrying sticks in endwise relation and discharging them successively into said accumulating box, means disposed in said accumulating box for causing the sticks to come to rest in parallel contact, guides for holding the sticks in parallel contact, automatic means for releasing the lowest of the sticks one-by-one from said guides, a conveyer for lifting the sticks one-by-one as released, and means for looping a web upon the sticks while being carried by said conveyer.

26. In a stick machine, the combination with a plurality of rack feeding means moving at successively slower speeds, of means for feeding sticks to the faster of said rack feeding means, a live rail mechanism for receiving the sticks from the slower of said rack feeding means, and stick straightening means for said live rail mechanism and certain of said rack feeding means.

27. The combination with stick carrying chains and driving means therefor, of web pull-off mechanism, and means effective when said mechanism is stopped for positively retarding the movement of sticks on said stick carrying chains, said retarding means being independent of said chain driving means.

28. The combination with stick carrying chains and driving means therefor, of web pull-off mechanism, a plurality of devices adapted to engage the ends of the sticks on said chains to maintain the sticks parallel, and means effective upon the stoppage of said web pull-off mechanism for operating said plurality of devices.

29. In a machine for mechanically feeding a web of paper, the combination of a conveyer for sticks for supporting the web, and means independent of said conveyer for preserving operative alinement of the sticks.

30. The combination with a pull-off mechanism, of movable means for supporting and permitting an accumulation of sticks carrying the looped web, and the means preventing displaced sticks from falling through the support when the web is pulled off.

In testimony whereof I affix my signature in presence of two witnesses.

WILLIAM F. MARRESFORD.

Witnesses:
J. S. WOOSTER,
G. N. KERR.

It is hereby certified that in Letters Patent No. 1,125,363, granted January 19, 1915, upon the application of William F. Marresford, of Brooklyn, New York, for an improvement in "Automatic Stick-Circulating Machines," an error appears in the printed specification requiring correction as follows: Page 7, line 17, after the word "means" insert the words *for maintaining the sticks substantially parallel;* and that the said Letters Patent should be read with this correction therein that the same may conform to the record of the case in the Patent Office.

Signed and sealed this 9th day of February, A. D., 1915.

[SEAL.]

J. T. NEWTON,

*Acting Commissioner of Patents.*